United States Patent [19]

Fife

[11] 3,985,937

[45] Oct. 12, 1976

[54] PAPERBOARD LAMINATING ADHESIVE CONTAINING POLYVINYL ACETATE/STYRENEBUTADINE POLYMERS; PARAFFIN WAX; CLAY; AND POLYALKYLENEGLYCOL

[75] Inventor: Rodger L. Fife, Cupertino, Calif.

[73] Assignee: Georgia-Pacific Corporation, Portland, Oreg.

[22] Filed: Sept. 8, 1975

[21] Appl. No.: 610,936

[52] U.S. Cl. .................................. 428/486; 156/334; 260/17.4 ST; 260/17.5; 260/28.5 R; 260/28.5 B; 260/29.2 UA; 428/500; 428/507; 428/511
[51] Int. Cl.$^2$ ....................... B32B 9/06; C08L 3/02; C08L 91/08
[58] Field of Search ................ 260/17.4 ST, 28.5 R, 260/28.5 B, 29.2 UA, 17.5; 428/511, 500, 507, 486; 156/334, 328

[56] References Cited

UNITED STATES PATENTS

| | | | |
|---|---|---|---|
| 3,477,871 | 11/1969 | Van Westrenen | 260/17.4 |
| 3,647,733 | 3/1972 | McDonald | 428/507 |
| R27,644 | 5/1973 | Kelly et al. | 260/17.4 |

OTHER PUBLICATIONS

Chem. Abstrs. vol. 75, 1971, Ungethuem et al., "Adhesives, Especially for Textiles."

*Primary Examiner*—Edward M. Woodberry
*Attorney, Agent, or Firm*—Peter P. Chevis

[57] ABSTRACT

A polymeric latex emulsion adhesive for lamination of paperboard is described.

18 Claims, No Drawings

PAPERBOARD LAMINATING ADHESIVE CONTAINING POLYVINYL ACETATE/STYRENEBUTADINE POLYMERS; PARAFFIN WAX; CLAY; AND POLYALKYLENEGLYCOL

This invention pertains to a paperboard laminating adhesive. More particularly it pertains to polymer latex emulsion adhesives to which clay and other additives are added and the laminated paperboard thus produced.

Corrugated paperboard is widely used in container manufacture where good rigidity and strength are required under various conditions. To increase strength, multi-core corrugated board and heavier corrugating medium are used. Many of the heavier corrugated medium are obtained by lamination of two or more corrugating medium paperboards prior to corrugation. Generally, the lamination is effected on the corrugating machine prior to passage of the laminated medium through the corrugating rolls. The adhesive used must be such that it may be rapidly applied to the mediums to obtain a good bond and to give a laminate which has good machineability to be operative at high speeds normally encountered in corrugating machinery. The adhesive used in lamination of the medium can greatly enhance the rigidity and moisture resistance of the resulting board obtained. For example, in manufacture of containers used for produce, such as vegetables and fruits, it is necessary to employ a paperboard having a relatively high degree of stiffness and rigidity and a high resistance to high humidity to which the containers are frequently exposed. Paper products or boards used in container manufacture usually contain from 7 to 10 percent by weight of moisture which may increase to above 30 percent upon exposure to high humidity or an environment of high moisture content. With increase in moisture content, the container may lose the major portion of it's rigidity and strength such that the containers lack sufficient rigidity for stacking of the containers, or to withstand the normal handling involved in shipment.

It is therefore an object of this invention to provide a paperboard laminating adhesive. A further object is to provide a paperboard laminating adhesive for use in lamination of corrugating medium. A still further object is to provide an adhesive for lamination of corrugating medium which will impart good water resistance to the laminate. A still further object is to provide a corrugated paperboard of improved moisture resistance.

The above and other objects are attained by this invention by use of a paperboard laminating adhesive which comprises a polyvinyl acetate or styrene-butadiene latex emulsion to which is added, based upon the latex solids content in the emulsion, of from 10 to 30 weight percent of clay, from 0.1 to 2 weight percent of paraffin wax added as an aqueous wax emulsion, said paraffin wax having a melting point in the range of 52° to 56° C, and from 0.1 to 2 weight percent of a polyglycol humectant and/or wetting agent. The above adhesive when applied to the laminated medium has good bonding and flow characteristics to permit high speed operation. It is thermosetting, so that the laminate after passing through the hot corrugating rolls is thermally set to impart good water resistance to the corrugated laminate.

The latex emulsions used may be polyvinyl acetate emulsion or a styrene-butadiene co-polymer latex emulsion where the proportion of styrene and butadiene are polymerized such that the co-polymer may contain from 45 to 55 percent styrene with the remainder being butadiene. These emulsions are commercially available in solids concentration of 50% and higher and are utilized for adhesives, coatings, and other uses. The particle size of the polymer is generally less than 2 microns.

In preparation of the laminating adhesive, the ingredients may be simply intermixed with the latex emulsions. Generally additional water may be added such that upon completion of the formulation the adhesive may contain from 50 to 55 percent solids. For example, to the latex, the clay may be added which acts as a filler and gives body to the adhesive. The addition of the wax emulsion improves fluidity and thus aids in obtaining better spread control in application of the adhesive. The addition of a polyglycol such as polyethylene glycol as di-or triethylene glycol or propylene glycol functions as a wetting agent and/or humectant to enhance the application of the adhesive to the paperboard. If desired, small amounts, usually in the range of 0.1 to 2 weight percent of the latex solids, of an extender such as starch flour may also be added. Generally when the starch flour is added a wetting agent such as trisodium phosphate is used with the starch which aids in the dispersion of the starch. The resulting adhesive obtained is relatively stable and may be used under conditions normally used in lamination and corrugation without any difficulty of the ingredients settling out or viscosity increasing excessively on standing to hinder operations. The adhesive is applied in amounts of from about 2.5 to 8 pounds per thousand square feet of board.

In formulation of the adhesive, the addition of a small amount of a lignosulfonate dispersant and furfuryl alcohol may also be beneficially employed. The lignosulfonate and the furfuryl alcohol may be added to any water which may be used in the formulation of the adhesive and may be added prior to the addition of other ingredients. However, the order of addition of the ingredients is not critical and the ingredients may be added in any order.

While any clay may be used, generally paper-grade kaolin clays are employed, especially if the laminated corrugated medium is to be used for produce or food container preparation. The wax emulsion used is a paraffin wax emulsion likewise of a grade commonly used in the paper industry. The emulsion generally contains from 25 to 60 percent of a wax having a melting point of from 52° to 56° C dispersed in particle size of from 1 to 2 microns.

In addition to starch, other extenders and additives such as protein and silicates may also be used in amounts not exceeding about 5%.

The ratio of the ingredients used in the adhesive may be widely varied. Generally, the clay is added in amount which represents from 10 to 30 percent of the latex emulsion solids, preferably from 15 to 20 percent. Surprisingly, only small amount of wax is necessary to obtain the desired fluidity necessary for the operation. The amount used may be from about 0.1 to 4 percent of the polymer latex solids. The wax is added as a wax emulsion which thus may be readily intermixed with the adhesive. The polyglycol likewise is added in a small amount generally in the range of 0.1 to 2 weight percent of the latex solids, with about ½ to 1 percent being preferred. The lignosulfonate dispersant and furfuryl alcohol when used are usually added in amounts, based upon the latex solids, of from .1 to 2 percent and of from 0.05 to 1 percent, respectively, preferably in amounts of from 0.5 to 1 percent and from 0.1 to 0.5 percent, respectively.

To further illustrate the invention, a 33-pound corrugated medium was laminated using various laminating adhesives and corrugated in the preparation of 200 pound C-flute corrugated board. The board made was tested dry and then maintained at 85% relative humidity at 40° F for periods of time of from about 30 to 120 days after which time the board was subjected to column crush test and the loss in strength noted. After 30 days the board under the controlled humidity conditions generally absorbs about 5 percent water, which increased so that after 120 days in the controlled atmosphere the board generally contains about 20 percent moisture. The adhesive of this invention was compared to the results obtained when a starch-borax adhesive and a starch adhesive to which ureaformaldehyde was added were used. The latter two adhesives are commonly used in corrugated paperboard manufacture.

The adhesive of this invention was prepared by adding to 25 gallons of water, thirteen pounds of a lignosulfonate dispersant which was a fermented calcium-base spent sulfite liquor and three pounds of furfuryl alcohol. To this solution, 3,500 pounds of a polyvinyl acetate latex emulsion were added. The polyvinyl acetate emulsion contained about 58 percent solids and had a Brookfield viscosity in the range of 1500 to 2500 centipoises. The particle size was in the range of 0.5 to 2 microns. To the mixture 350 pounds of clay, 3 gallons of wax emulsion, and 1½ gallons of triethylene glycol were added. The wax emulsion added was of a paraffin wax having a melting point in the range of 50° to 56° C and of the type commonly used in paper coating. The wax emulsion contained about 55 weight percent wax. After the ingredients were intermixed, 10 pounds of starch and one pound of trisodium phosphate were mixed into 11 gallons of water and the product intermixed into the adhesive. Additional water was then added to the adhesive to obtain an adhesive which contained about 55 percent solids in the total mix. In lamination of corrugating medium in the corrugating machine, the adhesive was applied at a rate of about 3.9 pounds of solids per thousand square feet of the medium.

The column-crush test used in evaluation of the corrugated boards prepared using the adhesives were involved determining the force necessary to crush the board vertically per lineal inch of board by subjecting a 10-inch square piece of board to an increasing load until the board is crushed. The dry board and samples of the board after being exposed for 30, 60, 90, and 120 days to the control humidity condition were tested. The strengths after the exposure were determined and compared to the strength of the dry board to determine what percentage of the dry strength was retained by the board upon exposure to the humid conditions for the particular times. The results obtained are shown in the table below:

| Adhesive | Dry Strength, No./Lineal Inch | Strength After Exposure & % of Dry Strength | | | |
|---|---|---|---|---|---|
| | | 30 days | 60 days | 90 days | 120 days |
| Vinyl Acetate-Clay-Wax | 53.1 | 49.9 94% | 39.8 75% | 37.7 71% | 36.6 69% |
| Starch-Borax | 54.1 | 50.9 94% | 32.5 60% | 24.3 45% | 13.5 25% |
| Starch-UF Resin | 55.2 | 51.9 94% | 36.9 67% | 29.8 54% | 17.7 32% |

What is claimed is:

1. A corrugating medium laminating adhesive which comprises a polymer latex emulsion adhesive selected from a group consisting of polyvinyl acetate homopolymers and styrenebutadiene polymers, admixed in water, based upon the polymer solids, with
   a. from 10 to 30 weight percent of clay,
   b. from 0.1 to 2 weight percent of a paraffin wax as an aqueous wax emulsion, said paraffin wax having a melting point in the range of 52° to 56° C, and
   c. from 0.1 to 2 weight percent of a polyalkyleneglycol wetting agent.
2. An adhesive of claim 1 wherein the polymer latex emulsion adhesive is polyvinyl acetate.
3. An adhesive of claim 1 wherein the polymer latex emulsion adhesive is styrene-butadiene polymer.
4. An adhesive of claim 1 wherein from 0.1 to 2 percent of a lignosulfonate dispersant is added.
5. An adhesive of claim 4 wherein from 0.05 to 1 weight percent of furfuryl alcohol is added.
6. An adhesive of claim 1 wherein the adhesive contains from 15 to 20 percent clay, from 0.5 to 1 percent wax, from 0.5 to 1 percent of triethylene glycol, and from 0.1 to 2 percent of a starch flour.
7. An adhesive of claim 6 wherein the polymer latex emulsion adhesive is polyvinyl acetate.
8. An adhesive of claim 6 wherein the polymer latex emulsion adhesive is a styrene-butadiene polymer containing from 45 to 55 percent styrene.
9. An adhesive of claim 7 wherein from 0.5 to 1 weight percent of a lignosulfonate dispersant and from 0.1 to 0.5 percent of furfuryl alcohol are added.
10. An adhesive of claim 8 wherein from 0.5 to 1 weight percent of a lignosulfonate dispersant and from 0.1 to 0.5 of furfuryl alcohol are added.
11. A laminated paper sheet prepared using adhesive of claim 1.
12. A laminated paper sheet prepared using adhesive of claim 6.
13. A laminated paper sheet prepared using adhesive of claim 9.
14. A laminated paper sheet prepared using adhesive of claim 10.
15. In a process of laminating a paperboard corrugating medium, the improvement which comprises using the adhesive of claim 1.
16. In a process of laminating a paperboard corrugating medium, the improvement which comprises using the adhesive of claim 6.
17. In a process of laminating a paperboard corrugating medium, the improvement which comprises using the adhesive of claim 9.
18. In a process of laminating a paperboard corrugating medium, the improvement which comprises using the adhesive of claim 10.

* * * * *